2 Sheets—Sheet 1.

W. K. SEAMAN.

RAIL STRAIGHTENING MACHINE.

No. 10.276. Reissued Jan. 23, 1883.

WITNESSES:

William Miller

Otto Hufeland

INVENTOR

William K. Seaman

BY Van Santvoord & Hauff

ATTORNEYS

2 Sheets—Sheet 2.

W. K. SEAMAN.

RAIL STRAIGHTENING MACHINE.

No. 10,276. Reissued Jan. 23, 1883.

WITNESSES:

William Miller

Otto Hufeland

INVENTOR

William K Seaman

BY Van Santvoord & Hauff

ATTORNEYS

UNITED STATES PATENT OFFICE.

WILLIAM K. SEAMAN, OF SCRANTON, PENNSYLVANIA.

RAIL-STRAIGHTENING MACHINE.

SPECIFICATION forming part of Reissued Letters Patent No. 10,276, dated January 23, 1883.

Original No. 266,536, dated October 24, 1882. Application for reissue filed December 14, 1882.

*To all whom it may concern:*

Be it known that I, WILLIAM K. SEAMAN, a citizen of the United States, residing at Scranton, in the county of Lackawanna and State of Pennsylvania, have invented new and useful Improvements in Rail-Straightening Machines, of which the following is a specification.

This invention relates to a machine which is intended for taking out lateral kinks from the rails, and to deliver them free from such imperfections to the cambering-machine. The novel construction of my rail-straightening machine which forms the subject-matter of this present invention is pointed out in the following specification.

Figure 1:
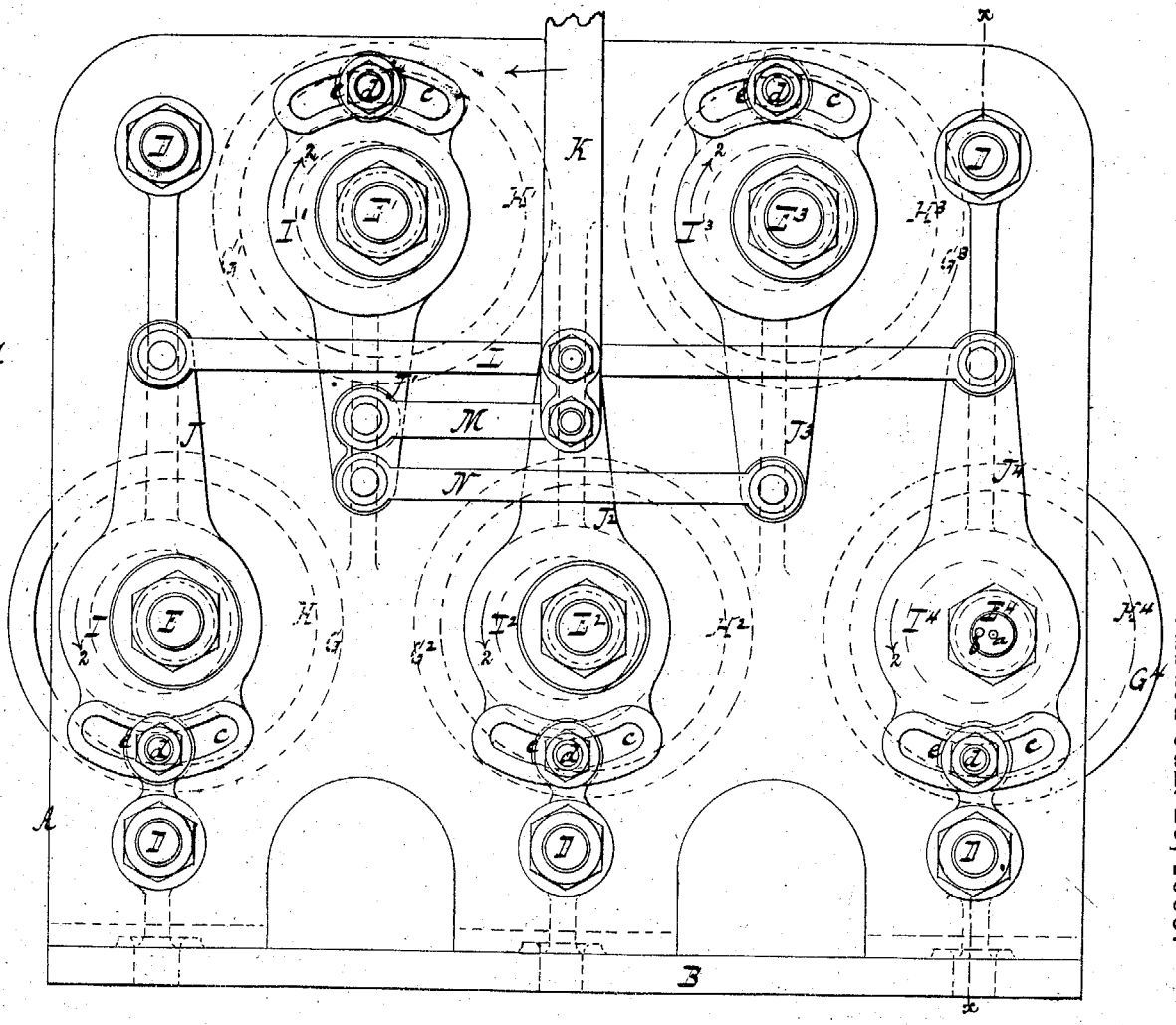
Figure 2:
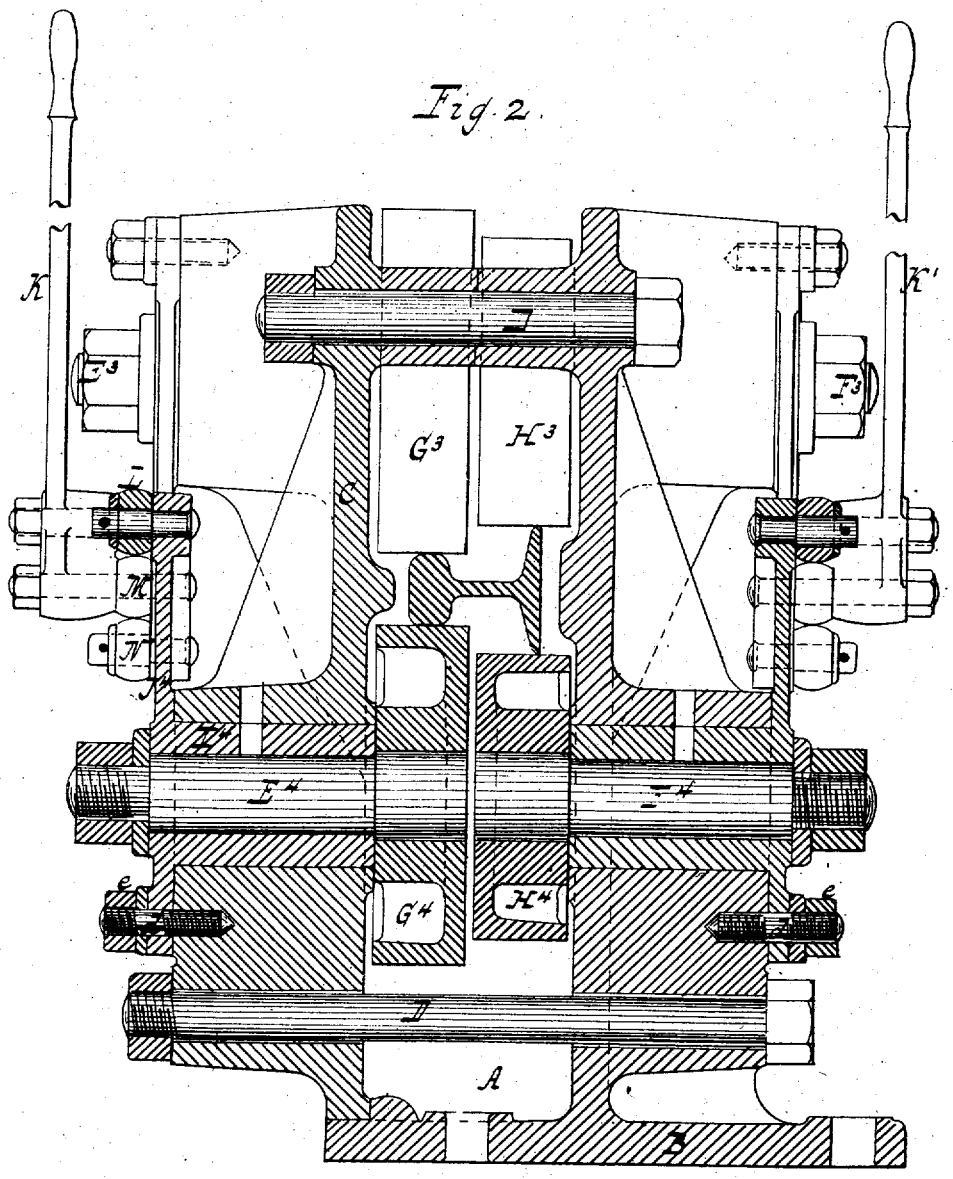

In the accompanying drawings, Figure 1 represents a side view of my machine. Fig. 2 is a transverse vertical section in the plane *x x*, Fig. 1.

Similar letters indicate corresponding parts.

In the drawings, the letter A designates a frame, which consists of a bed-plate, B, from which rise two standards, C C′, the standard C′ being cast solid with the bed-plate, while the standard C is held in position by the traverses D. In each of the standards C C′ are mounted five shafts, E E′ $E^2$ $E^3$ $E^4$ and F F′ $F^2$ $F^3$ $F^4$, respectively, and on the shafts E E′, &c., are mounted a series of rollers, G G′, &c., and on the shafts F F′, &c., are mounted a series of rollers, H H′, &c. The shafts E E′ $E^2$ $E^3$ $E^4$ are shown in Fig. 1 of the drawings, and on these shafts are firmly mounted the rollers G G′ $G^2$ $G^3$ $G^4$, which are indicated in dotted lines in Fig. 1, and two of which are shown in Fig. 2. The shafts E E′ $E^2$ $E^3$ $E^4$ have their bearings in eccentric bushes I I′ $I^2$ $I^3$ $I^4$, which are mounted in the standard C, and can be turned in their bearings, so that by turning said bushes the position of the rollers G G′ $G^2$ $G^3$ $G^4$ in relation to each other is changed. This will be readily understood by referring to Fig. 1, where the center of the shaft $E^4$ is designated by *a* and the center of the bush $I^4$ by *b*. By turning the bush in the direction of arrow 1 the axle $E^4$, together with its roller $G^4$, is raised, and by turning the bush in the opposite direction the axle $E^4$, together with the roller $G^4$, is depressed. From each of the bushes I I′ $I^2$ $I^3$ $I^4$ respectively extends an arm, J J′ $J^2$ $J^3$ $J^4$, and from the arm $J^2$ extends a lever, K, which connects with the arms J $J^4$ by a rod, L, and with the arm J′ by a rod, M, said arm J′ being connected to the arm $J^3$ by a rod, N. By pushing the lever K in the direction of the arrow marked near it in Fig. 1 the bushes I, $I^2$, and $I^4$ are turned in the direction of arrows 1, and the bushes I′ and $I^3$ are turned in the direction of arrows 2, and the rollers G $G^2$ $G^4$ are moved up and the rollers G′ $G^3$ are moved down. The rollers G G′ $G^2$ $G^3$ $G^4$ are intended to bear upon the head of the rail, as shown in Fig. 2, and by the action of the lever K said rollers can be so adjusted that they produce the desired effect upon the rail. In the arms J J′ $J^2$ $J^3$ $J^4$ are formed segmental slots *c*, through which extend screw-studs *d*, provided with nuts *e*. When the rollers G G′ $G^2$ $G^3$ $G^4$ have been adjusted in the required position the arms J J′ $J^2$ $J^3$ $J^4$ are locked by means of the nuts *e*, and the rollers cannot change their position until the nuts are released.

The rollers H H′ $H^2$ $H^3$ $H^4$, which are mounted on the shafts F F′ $F^2$ $F^3$ $F^4$, carried by the standard C′, bear upon the flange of the rail, (see Fig. 2,) and they are adjusted in the required position by means of the lever K′ precisely in the same manner in which the rollers G G′ $G^2$ $G^3$ $G^4$ are adjusted. The rails as they pass from the finishing-rolls are carried forward by a series of grip-rollers, which also serve to introduce the rails into and push them through the straightening-machine, when they are received by another set of grip-rollers, forming part of the cambering-machine. As the rails pass through the straightening-machine all lateral kinks existing in the same are removed, the action of the straightening-rollers being adjusted by means of the levers K K′ and a series of eccentric bushes connected therewith, as heretofore described.

If desired, the rollers G and H may be provided with flanges to confine the rails in the proper course; or said rollers may be slightly tapering. If necessary, the rollers H H′ $H^2$ $H^3$ $H^4$ may be provided with grooves to conform to the edges of the flanges of the rails and to prevent said flanges from getting injured.

My machine may also be used for straightening cold rails, and in this case it may be of advantage to impart to some of the rolls a positive motion by suitable gearing.

What I claim as new, and desire to secure by Letters Patent, is—

1. The combination, with a series of rollers, G G′, &c., and their axles, of the series of eccentric bushes I I′, &c., the adjusting-lever K, and intermediate connecting-rods, substantially as and for the purpose described.

2. The combination, with a series of rollers, G G′, &c., and their axles, of the second series of rollers, H H′, &c, and their axles, the eccentric bushes I, and the adjusting-levers K K′ and intermediate connecting-rods, substantially as and for the purpose described.

In testimony whereof I have hereunto set my hand and seal in the presence of two subscribing witnesses.

WM. K. SEAMAN. [L. S.]

Witnesses:
C. P. COLVIN,
EDWD. L. BUCK.